E. A. WALES.
HYDROCARBON BURNER.
APPLICATION FILED OCT. 23, 1916.
1,244,146.
Patented Oct. 23, 1917.
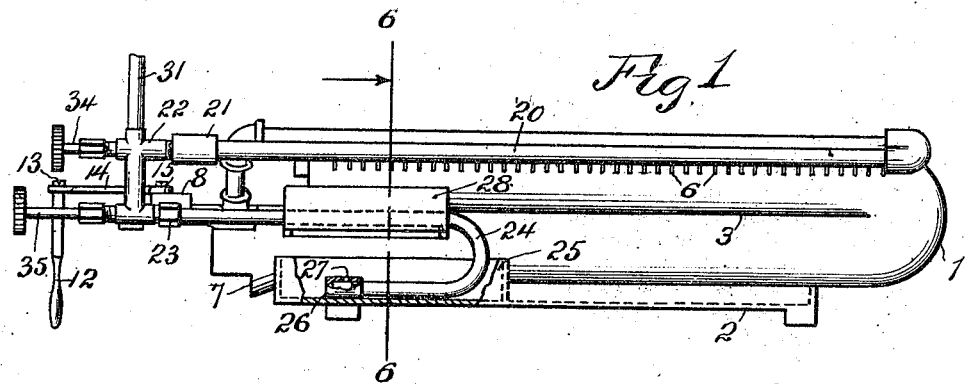
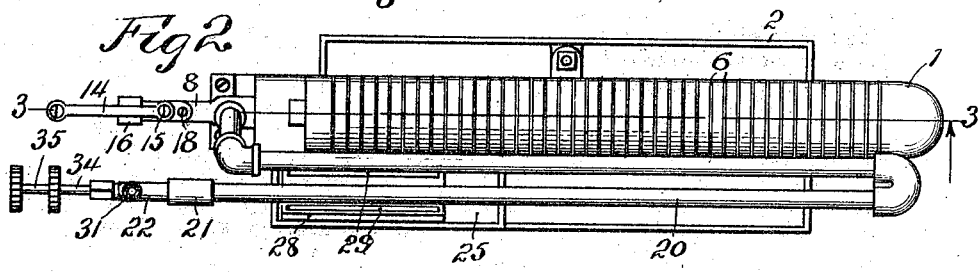
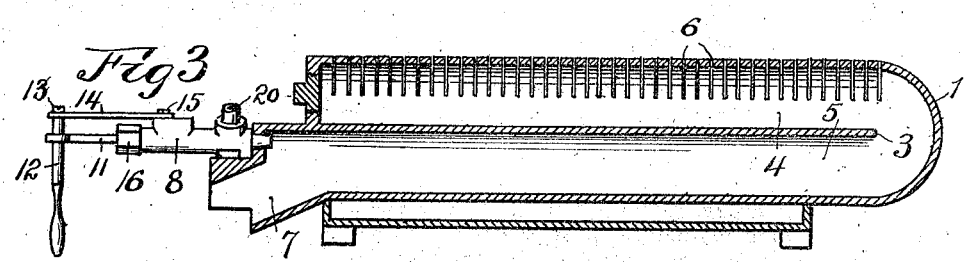
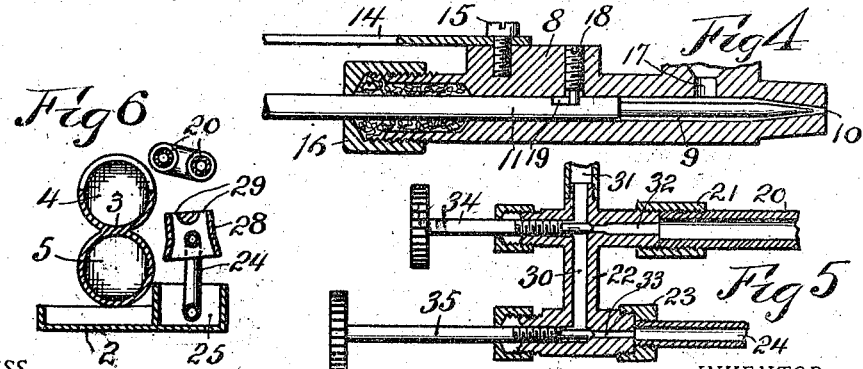
WITNESS.
R. L. Hamilton
INVENTOR.
Emory A. Wales
BY Warren D. House
His ATTORNEY

UNITED STATES PATENT OFFICE.

EMORY A. WALES, OF KANSAS CITY, MISSOURI.

HYDROCARBON-BURNER.

1,244,146. Specification of Letters Patent. Patented Oct. 23, 1917.

Application filed October 23, 1916. Serial No. 127,135.

*To all whom it may concern:*

Be it known that I, EMORY A. WALES, a citizen of the United States, residing at Kansas City, in the county of Jackson and State of Missouri, have invented a certain new and useful Improvement in Hydrocarbon-Burners, of which the following is a specification.

My invention relates to improvements in hydro-carbon burners.

It is particularly adapted to be used in a cooking stove, but it may be used in a heating stove or other place.

The object of my invention is to provide a compact and convenient arrangement of parts, which will enable the device to be inserted into the fire box of a cook stove through the end door thereof, and in which the operative parts are adapted for ready manipulation.

A further object of my invention is the provision of an improved collecting deflector of novel construction, which is adapted to collect and deflect burning gas against a generator tube.

Still another object of my invention is to provide novel valve mechanism by which the operator of the burner may easily regulate the flow of gas or vapor.

My invention provides further a novel arrangement of valves by which the supply of liquid fuel may be independently controlled with relation to a drip pan and a generator tube.

Other novel features of my invention are hereinafter fully described and claimed.

In the accompanying drawing, which illustrates the preferred embodiment of my invention.

Figure 1 is a view, partly in side elevation and partly broken away, of my improved hydro-carbon burner.

Fig. 2 is a plan view of the same.

Fig. 3 is a vertical sectional view on the line 3—3 of Fig. 2.

Fig. 4 is an enlarged longitudinal vertical sectional view of one of the fittings and parts connected therewith.

Fig. 5 is a vertical sectional view of another of the fittings, enlarged, and parts connected therewith.

Fig. 6 is a cross section on the line 6—6 of Fig. 1.

Similar reference characters designate similar parts in the different views.

1 designates a horizontal casing which is mounted upon a suitable base 2, which is adapted to rest upon the grate or bottom of a fire box of a cook stove.

The casing 1 is provided with a horizontal longitudinal partition 3, Fig. 3, which extends from one end of the casing to a point spaced apart from the other end of the casing and which divides the casing into an upper chamber and a lower chamber 4 and 5 which constitute respectively a burner chamber and a mixing chamber.

The burner chamber 4 is provided in its upper side with a plurality of transverse parallel discharge slots or openings 6, through which the mixed vapor, or gas and air is discharged.

The burner chamber 4 and mixing chamber 5 communicate with each other at the right end of the casing 1, as viewed in Fig. 3. The mixing chamber 5 at the other end of the casing is provided with a flaring air inlet 7.

In said end of the casing 1 is secured one end of a longitudinal horizontal fitting 8, which is shown enlarged in Fig. 4, and which is provided with a longitudinal hole 9, therethrough which constitutes a passage for the gas or vapor and which is provided with an outlet 10 which discharges into the mixing chamber 5.

The outlet 10 is controlled by means of a valve comprising a longitudinal rod 11 which is slidably mounted in the passage 9 and which is movable therein to and from a position closing the outlet 10.

The outer end of the valve 11 is provided with a vertical hole through which loosely extends a handle 12, the upper end of which is loosely pivoted by means of a screw 13 in the upper end of the handle to one end of a horizontal longitudinal link 14 which is fastened at its other end by a screw 15 to the upper side of the fitting 8.

A stuffing box 16 of ordinary construction encircles the valve 11 and has screw-threaded connection with the outer end of the fitting 8.

The fitting 8 is provided with an inlet 17 communicating with the passage 9 for supplying the latter with gaseous fuel.

The upper side of the fitting 8 is provided with a screw-threaded hole in which is fitted a screw 18 constituting a stop member, the lower end of which extends into a transverse groove 19, which is provided in the upper side of the valve 11. The screw 18 serves to limit the movement of the valve 11 in both directions, thus preventing the valve from being crowded into the tapering outlet 10 and also preventing the handle 12 from swinging too far in the other direction.

Upon swinging the handle 12 to the proper position, the flow of vapor or gas into the mixing chamber 5 through the outlet 10 may be controlled.

A U-shaped generator tube 20 is disposed with its arms parallel with and adjacent to the burner chamber 4, so that the flames from the slots 6 may heat said generator tube.

One arm of the generator tube 20 discharges into the passage 17 of the fitting 8. The other arm of the generator tube 20 is fastened by a union 21 to a fitting 22.

Secured to said fitting 22 by a union 23, is one arm of a U-shaped fuel pipe 24, which is disposed with one arm above the other and the lower arm of which is disposed in a drip pan 25 mounted on the base 2 below the generator tube 20, as shown in Fig. 1. The lower arm of the fuel pipe 24 is provided at its end with a cap 26, in the upper side of which is provided a discharge opening 27, arranged to discharge oil through the open bottom of a hollow rectangular collecting deflector 28, which has its ends pivotally mounted on the upper arm of the fuel pipe 24. The upper side of the collecting deflector 28 is provided with two longitudinal slots 29 which are adapted to respectively discharge the vaporized fuel against the two arms of the generator tube 20. In case that the generator tube becomes warped or sprung from its proper position in any manner, the deflector 28 may be swung so as to dispose the slots 29 in the proper position with relation to the arms of the generator tube 20.

The fitting 22 is provided with a vertical passage 30, Fig. 5, which at its upper end communicates with a fuel supply pipe 31, and which is provided with two lateral branches 32 and 33 which respectively discharge into one arm of the generator tube 20 and into the upper arm of the fuel pipe 24.

Two valves are mounted in the fitting 22 and have screw-threaded connection therewith and are adapted to respectively close the branches 32 and 33. These valves are designated by 34 and 35.

In the operation of the burner, the valve 35 is first opened, thus permitting oil to pass from the passage 30 through the branch 33 and into the fuel pipe 24 from which it is discharged through the opening 27 into the drip pan 25.

A supply of oil being deposited in the drip pan 25, the oil thus deposited is ignited and the burning oil heats the chambers 4 and 5. At the same time, vapor or burning gas is discharged through the deflector 28 and is directed in passing through the slots 29 against the two arms of the generator tube 20. When the generator tube has become sufficiently heated, the valves 34 and 11 are opened, the valve 35 having been closed after sufficient oil has been deposited in the drip pan 25. The oil will now pass from the passage 30 through the branch 32 and thence through the generator tube 20, in which it becomes vaporized, the vapor being discharged through the passage 17 and the passage 9 into the mixing chamber 5, in which chamber it mixes with air which enters the inlet 7, and the mixture then passes into the burner chamber 4 and escapes through the slots 6, following which it is ignited and keeps the generator tube 20 hot and also effects its function of heating the stove.

By having the burner chamber 4 and mixing chamber 5 separated only by the partition 3, the burner chamber more readily heats the mixing chamber, and at the same time a compact structure is afforded which is not liable to warp and which occupies a minimum of space vertically in the fire box of the cook stove.

The means provided for operating the valve 11 permits the operator of the cook stove to readily manipulate the valve with a poker or stick if desired, and if operated with the hand, it may be done so quickly that the operator is not long closely exposed to the heat of the stove.

I do not limit my invention to the structure shown and described, as modifications, within the scope of the appended claims, may be made without departing from the spirit of my invention.

What I claim is:—

1. In a hydro-carbon burner, a horizontal casing provided with a horizontal longitudinal partition extending from one end of the casing to a point adjacent to but not touching the other end of the casing and which divides the casing into a burner chamber and a mixing chamber, the former having discharge openings, and the latter having an air inlet, a generator tube discharging into said mixing chamber adjacent to said air inlet and disposed so as to be heated by the flame from said burner chamber discharge openings, a drip pan located so as to have oil burning therein heat both of said chambers, and a collecting deflector located above said drip pan and having a discharge opening adapted to discharge a flame against said generator tube.

2. In a hydro-carbon burner, a casing having a burner chamber, a generator tube adjacent thereto and discharging into the casing, a drip pan, a fuel pipe discharging into said drip pan, and a collecting deflector pivoted on said pipe and having a discharge slot adapted, when the deflector is swung to the proper position to direct a flame against said generator tube, the deflector being open at the bottom and disposed above said drip pan.

3. In a hydro-carbon burner, a burner chamber, a mixing chamber discharging therein, a U-shaped generator tube, one arm of which discharges into the mixing chamber, and which is located adjacent to the burner chamber, a drip pan, a collecting deflector having an open bottom located above said drip pan and having a discharge slot disposed so as to direct a flame against said generator tube, and means for supplying the generator tube and drip pan with fuel.

4. In a hydro-carbon burner, a burner chamber, a mixing chamber discharging therein, a U-shaped generator tube adjacent to the burner chamber and discharging into the mixing chamber, a drip pan, and a collecting deflector having an open bottom disposed above the drip pan and provided with two slots adapted to respectively direct flames against the two arms of said generator tube.

5. In a hydro-carbon burner, a U-shaped generator tube, a drip pan, a fuel pipe discharging into said drip pan, and a collecting deflector on said pipe and having an open bottom disposed above said drip pan and provided with two slots adapted to respectively direct flames against the two arms of said generator tube.

6. In a hydro-carbon burner, a mixing chamber, a fitting having a passage discharging into said mixing chamber, a slide valve in said fitting arranged to close the outlet of said passage and provided with a transverse groove, a stop member mounted in said fitting and extending into said groove and arranged to limit the movement of the valve in both directions, and means for sliding said valve.

7. In a hydro-carbon burner, a fitting having a passage provided with an outlet, a slide valve in said fitting adapted to close said outlet and provided with a transverse groove, a stop member in said fitting and extending into said groove and arranged to limit the movement of said valve in both directions, a link secured at one end to said fitting, and a handle pivoted to the other end of said link and engaging and adapted to move said valve toward and from said outlet.

8. In a hydro-carbon burner, a casing arranged horizontally and having therein a burner chamber and a mixing chamber, the burner chamber being disposed above the mixing chamber and communicating therewith, a fitting secured to said casing and having a passage discharging into the mixing chamber, a valve in said fitting for closing said passage, a U-shaped generator tube disposed adjacent to said burner chamber and having one arm discharging into said fitting, a fuel pipe, a drip pan into which said fuel pipe discharges disposed below the arms of said generator tube, a fitting connected with said fuel pipe and the other arm of said generator tube, the last named fitting having a passage provided with two branches discharging respectively into the fuel pipe and said other arm of the generator tube, and two independently operable valves mounted in the last named fitting and respectively controlling the flow through said two branches.

In testimony whereof I have signed my name to this specification.

EMORY A. WALES.